(12) United States Patent
Schoell

(10) Patent No.: US 7,900,454 B2
(45) Date of Patent: Mar. 8, 2011

(54) CONNECTING ROD JOURNALS AND CRANKSHAFT SPIDER BEARING IN AN ENGINE

(75) Inventor: Harry Schoell, Pompano Beach, FL (US)

(73) Assignee: Cyclone Power Technologies, Inc., Pompano Beach, FL (US)

( * ) Notice: Subject to any disclaimer, the term of this patent is extended or adjusted under 35 U.S.C. 154(b) by 810 days.

(21) Appl. No.: 11/879,589

(22) Filed: Jul. 17, 2007

(65) Prior Publication Data

US 2008/0025657 A1     Jan. 31, 2008

Related U.S. Application Data

(60) Division of application No. 11/489,335, filed on Jul. 19, 2006, which is a continuation of application No. 11/225,422, filed on Sep. 13, 2005, now Pat. No. 7,080,512.

(60) Provisional application No. 60/609,725, filed on Sep. 14, 2004.

(51) Int. Cl.
*F01K 1/00*     (2006.01)
*F01B 1/06*     (2006.01)

(52) U.S. Cl. .............. 60/670; 92/12.1; 92/58; 92/72
(58) Field of Classification Search ................ 60/670; 92/12.1, 58, 72
See application file for complete search history.

(56) References Cited

U.S. PATENT DOCUMENTS 2,264,484 A * 12/1941 Sharpe et al. ............. 74/580
4,194,404 A * 3/1980 Jager et al. ............... 74/44

\* cited by examiner

*Primary Examiner* — Hoang M Nguyen
(74) *Attorney, Agent, or Firm* — Robert M. Downey, P.A

(57) ABSTRACT

In an engine having a crankshaft driven by reciprocating pistons in an arrangement of cylinders, a spider bearing is fixed to a crankshaft journal that is offset from the central axis of the crankshaft. Each piston is drivingly linked to the spider bearing by a connecting rod. Circular links at the opposite ends of each connecting rod are fitted with an inner bearing ring to provide low friction movement of the ends of each connecting rod relative to the piston and the spider bearing. Hubs equally spaced about the central axis of the spider bearing enable connection of the rod links to the spider bearing. In a preferred embodiment, the spider bearing is formed of a bearing material that surrounds the outer surface of the connecting rod links which, combined with the inner bearing rings, provides a double-backed bearing for carrying the piston load.

4 Claims, 5 Drawing Sheets

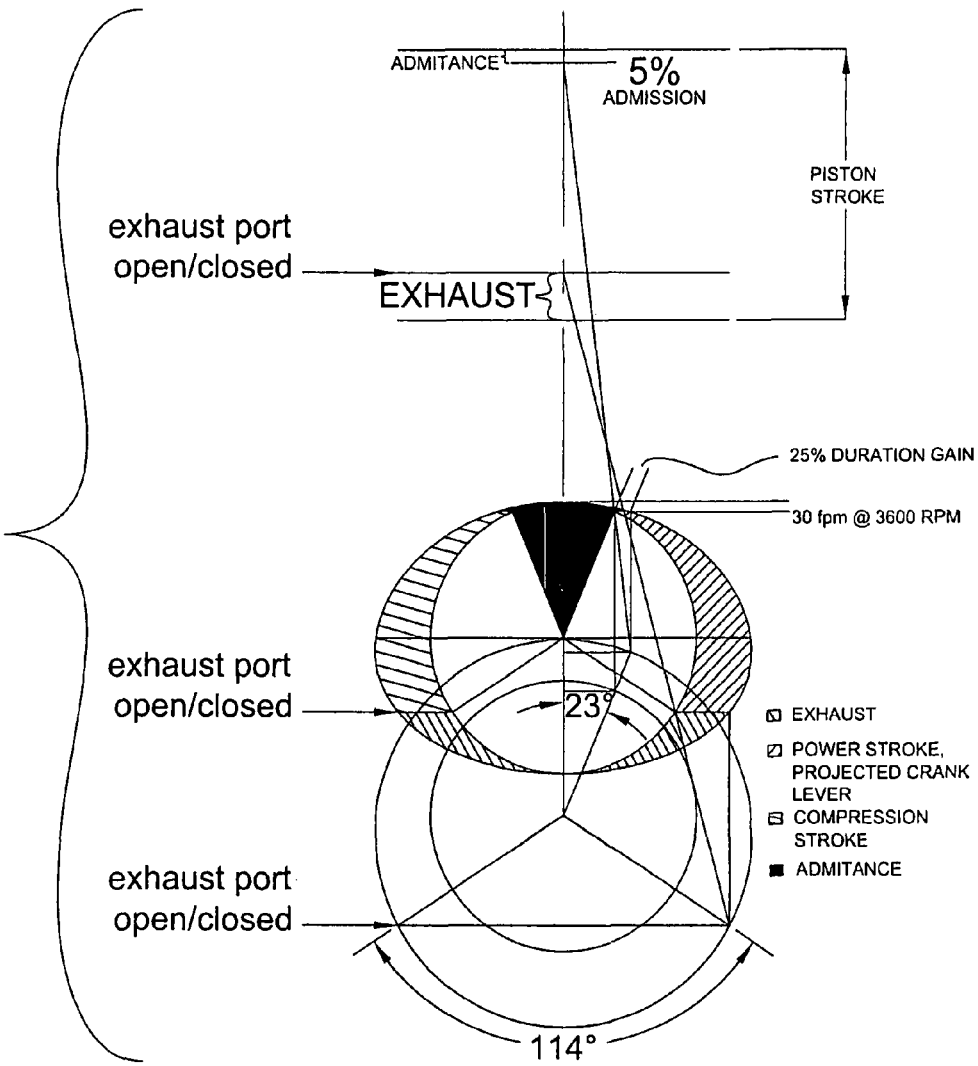

CONNECTING ROD JOURNALS AND CRANKSHAFT SPIDER BEARING IN AN ENGINE

This application is a divisional patent application of U.S. patent application Ser. No. 11/489,335 filed on Jul. 19, 2006 which is a continuation application of U.S. patent application Ser. No. 11/225,422 filed on Sep. 13, 2005 and now issued U.S. Pat. No. 7,080,512 B2 and which claims the benefit of provisional patent application Ser. No. 60/609,725 filed on Sep. 14, 2004.

BACKGROUND OF THE INVENTION

1. Field of the Invention

The invention relates to a crankshaft drive assembly in engines and, more particularly, to an assembly of pistons, connecting rods and a crank disk for drivingly rotating a crankshaft in an engine.

2. Discussion of the Related Art

Generally, piston driven engines derive greater torque and power from a longer piston stroke, a longer crank lever arm and by using more cylinders, each with an associated reciprocating piston and connecting rod. However, a longer piston stroke and crank lever arm demands greater engine size which increases engine weight and occupies more space. Additionally, the use of a longer stroke reduces engine efficiency and places added stress on the connecting rods at the linkages to both the pistons and the crank cam.

Accordingly, there remains a need for an improved connecting rod and crank disk assembly that provides for optimal power stroke of the pistons in a compact engine, while providing for greater engine efficiency and reduced friction. There is a further need for an improved connecting rod and crank disk structure that is designed to handle higher loads at the connection of the rods with the pistons and the crank disk.

OBJECTS AND ADVANTAGES OF THE INVENTION

With the foregoing in mind, it is a primary object of the present invention to provide a connecting rod and crank disk arrangement in an engine that is compact and which operates at high efficiency.

It is a further object of the present invention to provide a connecting rod and crank disk assembly that provides for higher load handling and distribution at both the linkage of the connecting rods to the pistons and the linkage of the connecting rods to the crank disk.

It is still a further object of the present invention to provide a double-backed bearing connection of connecting rods to the pistons and a spider bearing (i.e. crank disk) in an engine to provide for greater load distribution and absorption with less friction.

It is still a further object of the present invention to provide a connecting rod and spider bearing (i.e. crank disk) assembly in an engine, wherein the connecting rods are arranged in vertical alignment during the power stroke of each piston to thereby transfer full force of the power stroke to the crank disk and crankshaft.

These and other objects and advantages of the present invention are more readily apparent with reference to the detailed description and accompanying drawings.

SUMMARY OF THE INVENTION

The present invention is directed to an assembly of connecting rods, pistons and a spider bearing (i.e. crank disk) and, more particularly, to an assembly of connecting rod journals and a crankshaft spider bearing in an engine. The connecting rods of the engine are designed to handle loads that are higher than those encountered by internal combustion engines of comparable horsepower. To withstand such loads, the connecting rods are provided with a double set of bearings, both at the piston wrist pin and at the journal where the connecting rods join the spider bearing on the crankshaft. The load forces acting on these bearings are distributed over a larger supporting area without sacrificing space that a single set of wider bearings would require.

The connecting rods are driven by the spider bearing (i.e. crank disk). These rods are mounted at equal intervals around the periphery of this circular spider bearing. The lower double bearings joining the piston connecting rods to the spider bearing are designed to limit the angular deflection of the connecting rods so that clearance is maintained between all six rods during one full rotation of the engine. The center of the spider bearing is yoked to a single crankshaft journal that is offset from the central axis of the crankshaft. While the bottom ends of the connecting rods rotate in a circle about the spider bearing, the offset of the crank journal on which the spider bearing rides creates a geometry that makes the resultant rotation of these rods describe an elliptical path. This unique geometry confers two advantages to the operation of the engine. First, during the power stroke of each piston, its connecting rod is in vertical alignment with the motion of the driving piston, thereby transferring the full force of the stroke. Second, the offset between the rods and the spider bearing, the offset between the spider bearing and the crank journal, and the offset of the crank journal to the crankshaft itself, combine to create a lever arm that amplifies the force of each individual power stroke without increasing the distance the piston travels.

The arrangement of the connecting rods and limitation of angular deflection of each connecting rod relative to the spider bearing allows the spider bearing to remain on the same X,Y axis without circular rotation. This prevents the spider bearing from collapsing which would result in jamming of the connecting rods. Maintaining the spider bearing on the same X,Y axis, as it moves in an orbital path relative to the central axis of the crankshaft, also allows for direct opposing piston connecting rods with perfect balance of piston travel and timing, so that all pistons and connecting rods travel the same distance with each stroke.

BRIEF DESCRIPTION OF THE DRAWINGS

For a fuller understanding of the nature of the present invention, reference should be made to the following detailed description taken in conjunction with the accompanying drawings in which:

FIG. 5 is a power stroke diagram.

Like reference numerals refer to like parts throughout the several views of the drawings.

DETAILED DESCRIPTION OF THE PREFERRED EMBODIMENT

Figure 1:
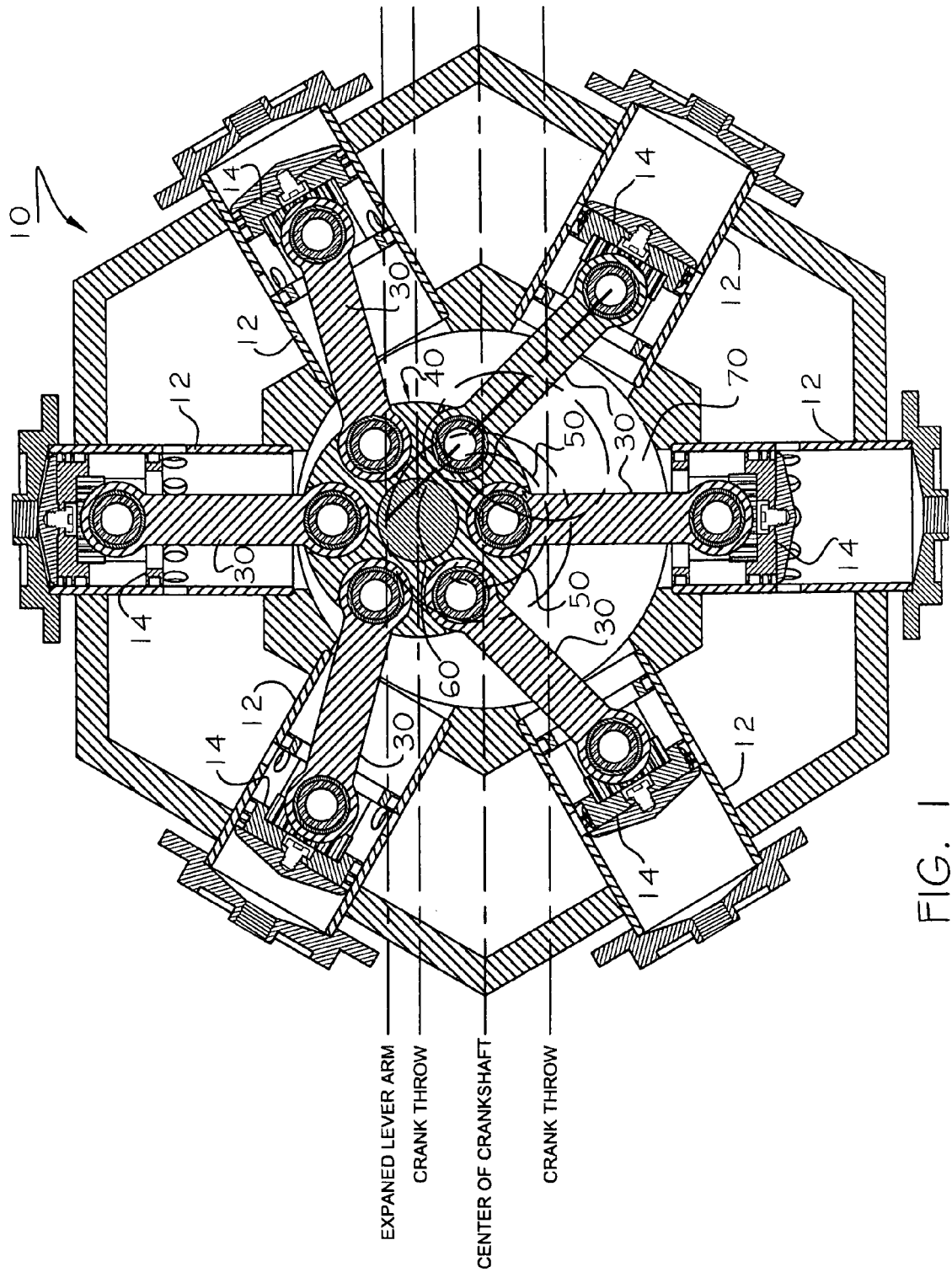
FIG. 1 is a top plan view, in partial cross-section, showing an arrangement of pistons and cylinders surrounding a crankshaft and crankshaft journal to which a spider bearing is fixed, and wherein the pistons of each cylinder are drivingly linked to the spider bearing via connecting rods.
Figure 2:
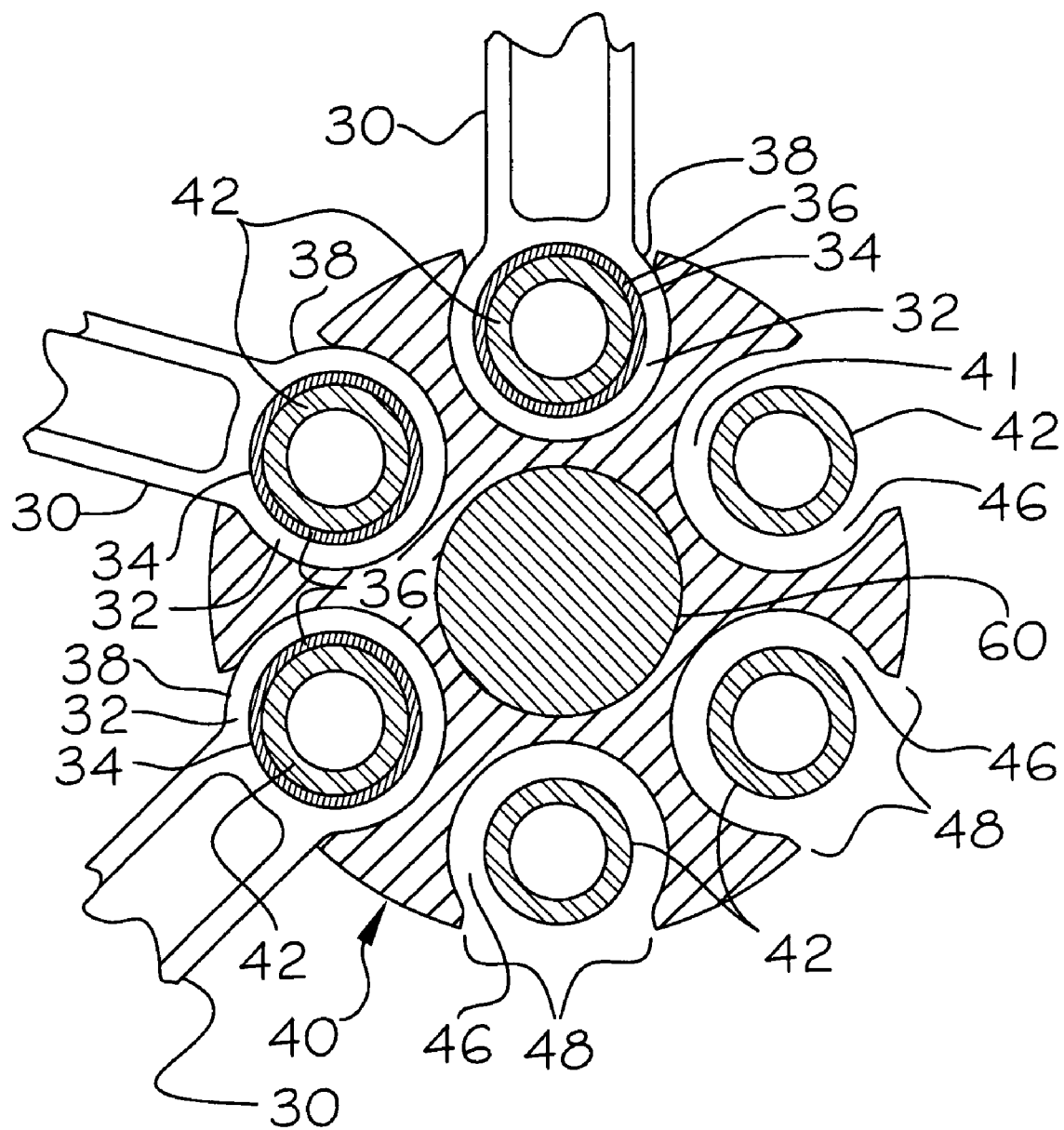
FIG. 2 is an isolated top plan view of the spider bearing fixed to the crankshaft journal, shown partially assembled with 3 connecting rods linked to the spider bearing using wrist pins.
Figure 3:
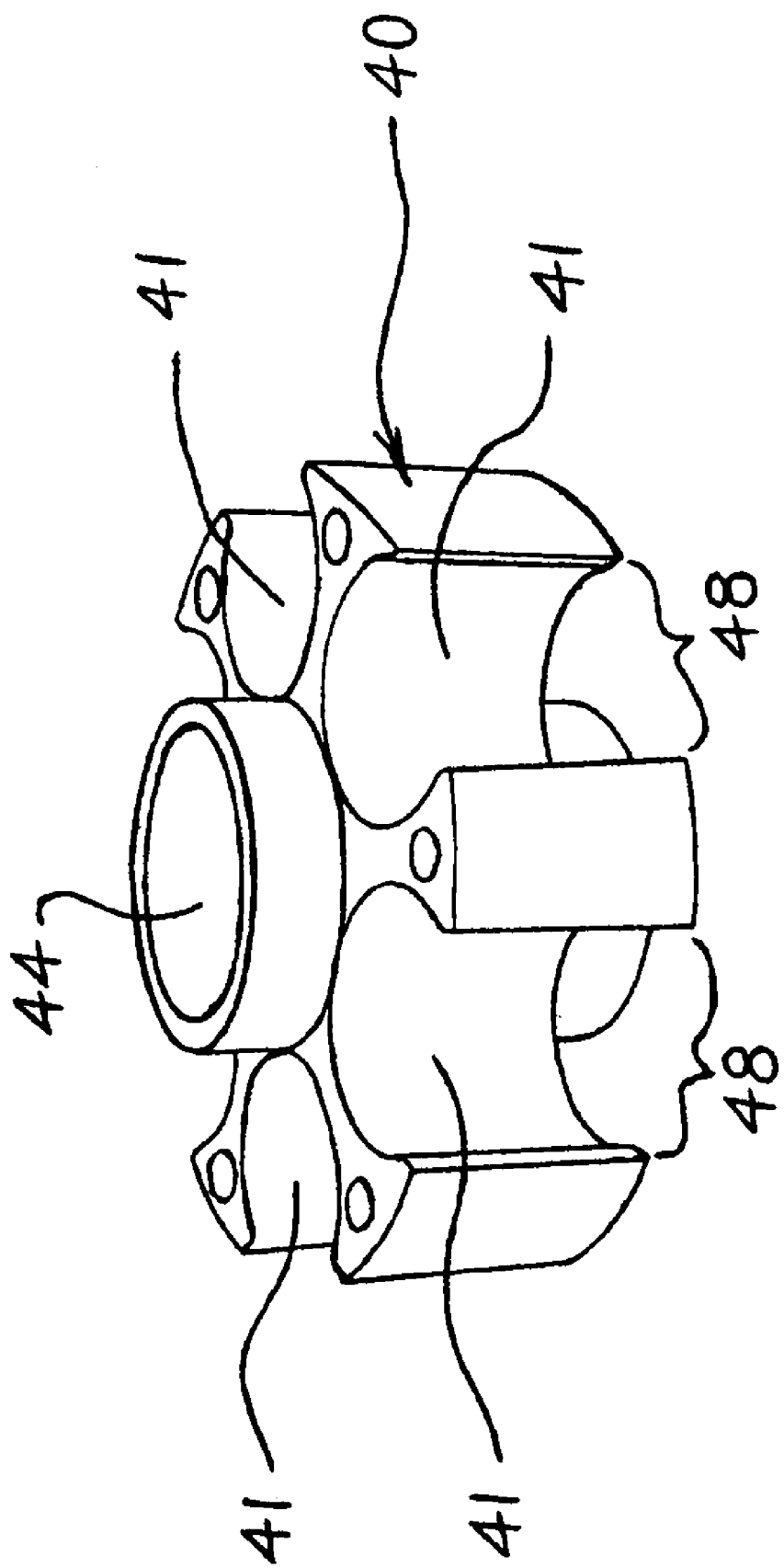
FIG. 3 is a perspective view of the spider bearing.
Figure 4:
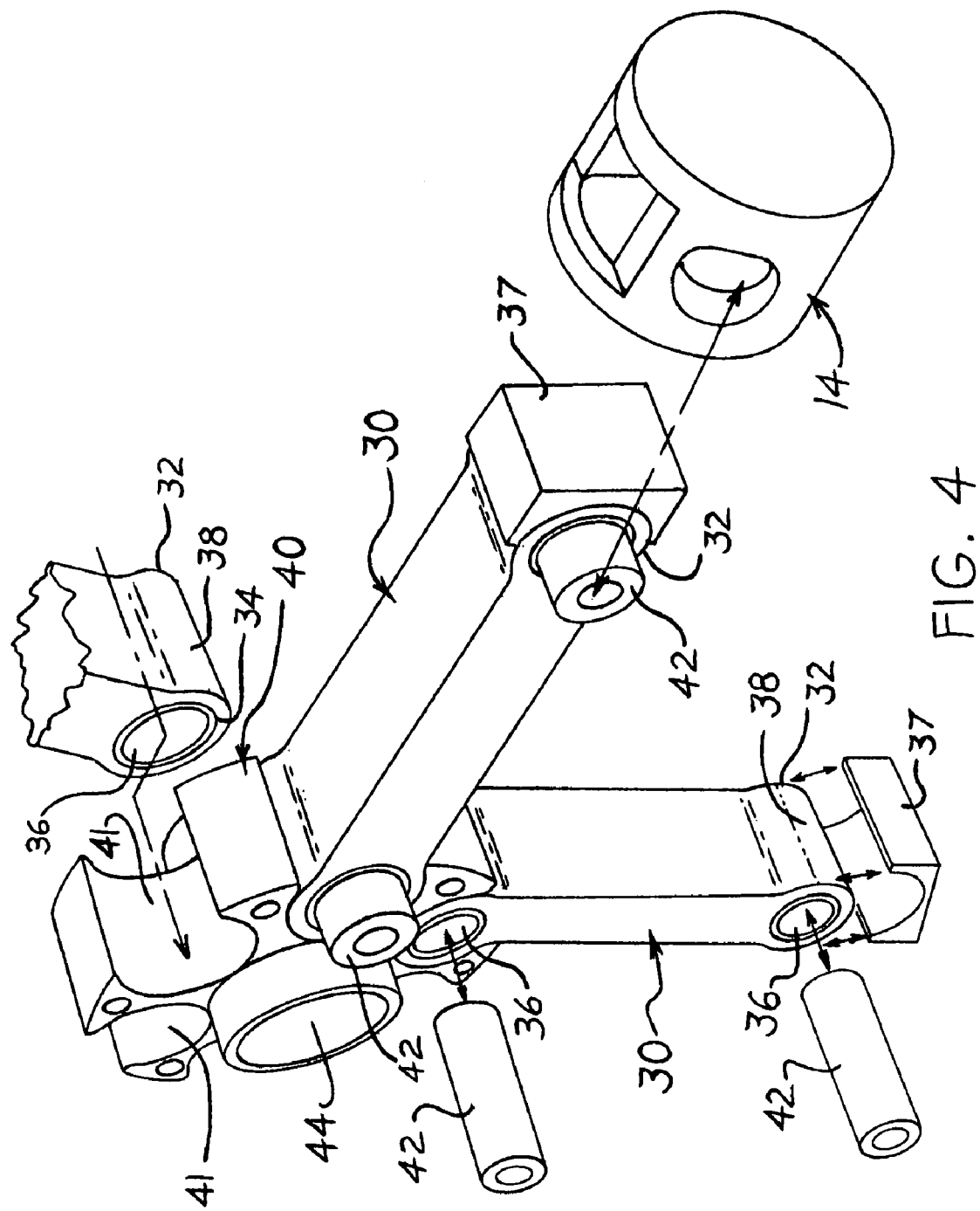
FIG. 4 is an isolated, partially exploded perspective view of the spider bearing showing connection of the connecting rods to the pistons and the spider bearing using bearing rings and wrist pins.

As seen in FIG. 1, the engine 10 has cylinders 12 arranged in a radial configuration with each cylinder including a reciprocating piston 14. A cam moves push-rods (not shown) to control opening of steam injection valves (not shown). At higher engine speeds, the steam injection valves are fully opened to inject steam into the cylinders 12 causing the pistons 14 to be pushed radially inward. A spider bearing 40 is coaxially fixed to a crank journal 60 of crankshaft 50 and includes a plurality of round cavities 41 spaced at equal intervals about a central axis of the spider bearing 40 at a common radius from the central axis of the spider bearing. Each of the round cavities 41 has an open mouth 48 on an outer circumferential periphery of the spider bearing. Movement of the pistons 14 causes connecting rods 30 to move radially inward to move the spider bearing 40 in an orbital path relative to the rotational axis of the crankshaft 50 while the spider bearing 40 remains on the same X,Y axis without rotating. This action serves to drivingly rotate the crankshaft 50 without any rotation or twist of the spider bearing 40 from its steady X,Y axis, thereby preventing jamming of the connecting rods 30 while maintaining perfect balance of piston travel and timing so that all pistons 14 and connecting rods 30 travel the same distance with each stroke. The opposite ends of the connecting rods are formed in a circular configuration defining connecting rod links 32 with an inner circular surface 34 and an outer surface 38. One end of each connecting rod 30 pivotally connects to a piston 14 with a wrist pin 42. A bearing ring 36 is placed between the wrist pin 42 and inner circular surface 34 of link 32. Additionally, a shoe bearing 37 is placed between the outer surface 38 of link 32 and the piston 14 to provide a double-backed bearing at the linkage of the connecting rod 30 to the piston 14. As shown in FIG. 2, each connecting rod 30 connects to the spider bearing 40. More specifically, the inner circular surface 34 of the connecting rod link 32 is fitted with a bearing ring 36 for engagement about wrist pin 42 attached to the spider bearing 40 within a round cavity 41. In a preferred embodiment, the spider bearing 40 is formed of a bearing material which surrounds the outer surface 38 of the connecting rod link 32, thereby providing a double-backed bearing to carry the piston load.

The connecting rods 30 are driven by this spider bearing 40 and are mounted at equal intervals around the periphery of this circular bearing (i.e., spider bearing 40). Specifically, the wrist pins 42 are spaced at the same distance (i.e., radius) from the central axis of the spider bearing 40, within the round cavities, and at equal intervals about 360° surrounding the central axis. Referring to FIG. 2, the lower portions of the double-backed bearings joining the piston connecting rods 30 to the spider bearing 40 are designed to limit the angular deflection of the connecting rods 30 so that clearance is maintained between all six connecting rods 30 during one full rotation of the crankshaft 50. More particularly, each wrist pin 42 on the spider bearing 40 is surrounded by an annular channel 46 for receiving the circular rod link 32. Each channel communicates with the open mouth 48 on the outer circumferential periphery of the spider bearing 40. This mouth 48 of each round cavity 41 limits the distance of angular deflection of the connecting rod 30.

The center 44 of the spider bearing 40 is yoked to a single crankshaft journal 60 that is offset from the central axis of the crankshaft 50. While the bottom ends of the connecting rods rotate in a circle about the spider bearing 40, the offset of the crank journal on which the spider bearing rides creates a geometry that makes the resultant rotation of these rods travel about an elliptical path within the space 70 that is surrounded by the cylinders 12. This unique geometry confers two advantages to the operation of the engine. First, during the power stroke of each piston 14, its connecting rod 30 is in vertical alignment with the motion of the driving piston, thereby transferring the full force of the stroke. Second, the offset between the connecting rods 30 and the spider bearing 40, the offset between the spider bearing 40 and the crank journal 60, and the offset of the crank journal 60 to the crankshaft 50 itself, combine to create a lever arm that amplifies the force of each individual power stroke without increasing the distance the piston 14 travels. A diagram showing this unique power stroke is shown in FIG. 5. Accordingly, the mechanical efficiency is enhanced. This arrangement also provides increased time for steam admission and exhaust.

While the present invention has been shown and described in accordance with a preferred and practical embodiment thereof, it is recognized that departures from the instant disclosure are contemplated within the spirit and scope of the present invention, which is not intended to be limited except as defined in the following claims under the doctrine of equivalents.

What is claimed is:

1. In an engine having an arrangement of cylinders with reciprocating pistons for drivingly rotating a crankshaft, an assembly comprising:
   a crank journal orbitally linked to the crankshaft and having a central axis offset and parallel to a central axis of the crankshaft;
   a spider bearing coaxially fixed to said crank journal and including a plurality of round cavities spaced at equal intervals about a central axis of said spider bearing at a common radius from said the central axis of said spider bearing, and each of said plurality of round cavities having an open mouth on an outer circumferential periphery of said spider bearing;
   a wrist pin fitted within each of said plurality of round cavities to define an annular channel about said wrist pin in each of said plurality of round cavities, and said annular channel communicating with the open mouth in each of said plurality of round cavities on the outer circumferential periphery of said spider bearing;
   a plurality of connecting rods each having opposite ends including a first end structured for pivotal linkage to a respective one of the reciprocating pistons and an opposite second end structured for pivotal receipt within a respective one of said plurality of round cavities and about said wrist pin to pivotally link said second end to said spider bearing; said plurality of connecting rods being structured, disposed and arranged for moving said spider bearing in an orbital path relative to a rotational axis of said crankshaft while maintaining said spider bearing on a steady vertical and horizontal axis without rotating;
   said open mouths of said plurality of said round cavities of said spider bearing being structured and disposed to limit angular deflection of said connecting rods as said spider bearing moves in said orbital path relative to the rotational axis of said crankshaft; and
   wherein reciprocating movement of the pistons within the cylinders drives the connecting rods to move the spider bearing through said orbital path, and to thereby rotate the crankshaft.

2. The assembly as recited in claim 1 wherein said first and second ends of each of said plurality of connecting rods are structured to include a closed circular link having an inner annular surface and an outer annular surface.

3. The assembly as recited in claim 2 further comprising:
a plurality of bearing rings each sized and configured for placement within a respective one of said closed circular links on said opposite first and second ends of each of said plurality of connecting rods and each of said plurality of bearing rings engaging said inner annular surface to absorb the piston load while reducing friction and wear resulting from movement of said circular links relative to the pistons and said spider bearing.

4. The assembly as recited in claim 3 wherein said spider bearing includes a bearing material for reducing friction and absorbing load between said outer annular surface on said second ends of said connecting rods and said annular channels of said spider bearing, and wherein said bearing rings and said bearing material of said spider bearing provide a double-backed bearing against said inner and outer annular surfaces of said second ends of said connecting rods for carrying a piston load.

\* \* \* \* \*